(12) United States Patent
Tsujita et al.

(10) Patent No.: US 7,050,387 B2
(45) Date of Patent: May 23, 2006

(54) OPTICAL STORAGE MEDIUM

(75) Inventors: Kouji Tsujita, Yokohama (JP); Mikio Okumura, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 102 days.

(21) Appl. No.: 10/606,801

(22) Filed: Jun. 27, 2003

(65) Prior Publication Data
US 2004/0008612 A1 Jan. 15, 2004

(30) Foreign Application Priority Data
Jun. 28, 2002 (JP) ............................. 2002-190115

(51) Int. Cl.
*G11B 3/70* (2006.01)

(52) U.S. Cl. ...................................... 369/283

(58) Field of Classification Search ................ 369/283; 428/64.1; 156/196; 430/270.11
See application file for complete search history.

(56) References Cited

U.S. PATENT DOCUMENTS

| | | | | |
|---|---|---|---|---|
| 5,338,646 A | * | 8/1994 | Nakayama et al. | .... 430/270.11 |
| 5,702,792 A | * | 12/1997 | Iida et al. | ................. 428/64.1 |
| 5,876,823 A | * | 3/1999 | Nagashima | ................ 428/64.1 |
| 6,280,811 B1 | * | 8/2001 | Nee | .......................... 428/64.1 |
| 6,309,729 B1 | * | 10/2001 | Glushko et al. | ........... 428/64.1 |
| 2002/0020484 A1 | * | 2/2002 | Feist et al. | ................... 156/196 |

FOREIGN PATENT DOCUMENTS

| JP | 02046442 A | * | 2/1990 |
|---|---|---|---|
| JP | 10-083568 | | 3/1998 |
| JP | 143924 | | 5/1998 |
| JP | 10143924 A | * | 5/1998 |

\* cited by examiner

Primary Examiner—Tianjie Chen
(74) Attorney, Agent, or Firm—Jacobson Holman PLLC

(57) ABSTRACT

An optical disk has a first substrate having a recording layer thereon, information to be recorded on the recording layer being reproducible with irradiation of a laser beam, a reflective layer formed on the recording layer, and a second transparent substrate, the laser beam being incident to the second substrate in reproduction. The first and the second substrates are bonded to each other by a bonding layer via the reflective layer. The bonding layer includes ultraviolet-hardened resin and at least one type of photochromic dye that is stable against the laser beam. In another type, the first substrate maybe transparent. Instead of the second substrate, this type has a hardcoat layer formed on a surface of the first substrate opposite to another surface thereof having the recording layer thereon, the laser beam being incident to the hardcoat layer in reproduction. The hardcoat layer includes ultraviolet-hardened resin and at least one type of photochromic dye that is stable against the laser beam.

7 Claims, 12 Drawing Sheets

OPTICAL STORAGE MEDIUM

BACKGROUND OF THE INVENTION

The present invention relates to an optical storage medium. Particularly, this invention relates to an optical storage medium having an information-visible zone indicating additional medium-related information.

Compact discs (CD) and digital versatile discs (DVD) are popular optical storage media.

Single-substrate-type optical storage media such as CDs have an information-visible zone on a label layer indicating additional medium-related information on the medium surface opposite to the signal-reproducing surface, by silk screen printing or offset printing.

In contrast, dual-substrate-type optical storage media such as DVDs do not have a space for such a label layer due to their disk diameter of 120 mm, center-hole diameter of 15 mm and inner storage-zone diameter of 46 mm, like CDs, thus, recording additional medium-related information being impossible.

In order to overcome such a problem, Japanese Unexamined-Patent Publication No. 10-143924 (1998) discloses "OPTICAL INFORMATION RECORDING MEDIUM". The recording medium has two transparent disk substrates, formed on each substrate is a recording layer. The substrates are stuck to each other so that the recording layers face each other. Visibly printed on the disk surface, on which a laser beam is to be incident for reproduction, is a light-absorptive discoloring material, in accordance with the recorded contents.

Such printing is feasible for ROM- and dual-substrate-type DVDs because the recorded contents will not be changed.

On the contrary, RAM-type DVDs require rewritable information visibly formed thereon, related to the recorded contents, because users are allowed to rewrite the recorded contents.

SUMMARY OF THE INVENTION

An object of the present invention to provide an optical storage medium having a visible and rewritable information layer.

The present invention provides an optical disk comprising: a first substrate having a recording layer thereon, information to be recorded on the recording layer being reproducible with irradiation of a laser beam; a reflective layer formed on the recording layer; a second transparent substrate, the laser beam being incident to the second substrate in reproduction; and a bonding layer provided between the first and the second substrates, the substrates being bonded to each other by the bonding layer via the reflective layer, the bonding layer including ultraviolet-hardened resin and at least one type of photochromic dye, the photochromic dye being stable against the laser beam.

Moreover, the present invention provides an optical disk comprising: a transparent substrate having a recording layer thereon, information to be recorded on the recording layer being reproducible with irradiation of a laser beam; a reflective layer formed on the recording layer; and a hardcoat layer formed on a surface of the substrate opposite to another surface thereof having the recording layer thereon, the laser beam being incident to the hardcoat layer in reproduction, the hardcoat layer including ultraviolet-hardened resin and at least one type of photochromic dye, the photochromic dye being stable against the laser beam.

Furthermore, the present invention provides an optical disk comprising: a first substrate having a recording layer thereon, information to be recorded on the recording layer being reproducible with irradiation of a laser beam; a reflective layer formed on the recording layer; and a second transparent substrate, the laser beam being incident to the second substrate in reproduction; a bonding layer provided between the first and the second substrates, the substrates being bonded to each other by the bonding layer via the reflective layer; and a hardcoat layer formed on the second substrate at a surface thereof through which the laser beam is incident to the second substrate in reproduction, the hardcoat layer including ultraviolet-hardened resin and at least one type of photochromic dye, the photochromic dye being stable against the laser beam.

Still furthermore, the present invention provides an optical disk comprising: a first transparent substrate having a first recording layer thereon, information to be recorded on the first recording layer being reproducible with irradiation of a first laser beam; a first reflective layer formed on the first recording layer; a second transparent substrate having a second recording layer thereon, information to be recorded on the second recording layer being reproducible with irradiation of a second laser beam; a second reflective layer formed on the second recording layer; a bonding layer provided between the first and the second substrates, the substrates being bonded to each other by the bonding layer via the first and the second reflective layers; a first hardcoat layer formed on the first substrate at a surface thereof through which the first laser beam is incident to the first substrate in reproduction, the first hardcoat layer including ultraviolet-hardened resin and at least one type of photochromic dye, the photochromic dye being stable against the first laser beam; and a second hardcoat layer formed on the second substrate at a surface thereof through which the second laser beam is incident to the second substrate in reproduction, the second hardcoat layer including ultraviolet-hardened resin and at least one type of photochromic dye, the photochromic dye being stable against the second laser beam.

DETAILED DESCRIPTION OF THE EMBODIMENTS

Several embodiments according to the present invention will be disclosed with reference to the attached drawings.

[First Embodiment]

Figure 1:
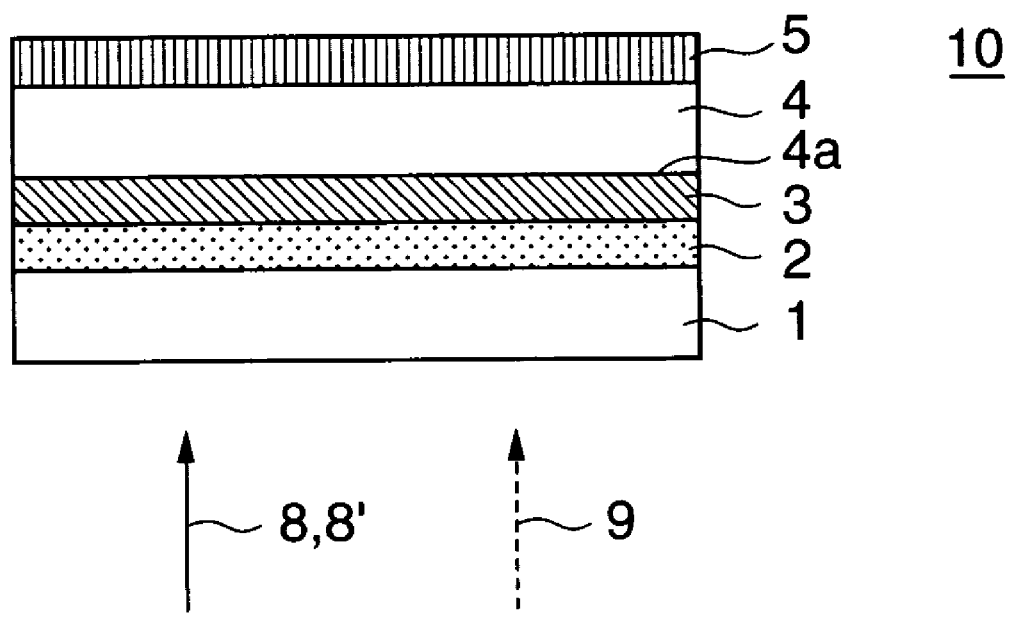
FIG. 1 illustrates a cross section of a first embodiment of optical storage medium according to the present invention.

Illustrated in FIG. 1 is a cross section of a first embodiment of optical storage medium according to the present invention.

An optical storage medium 10 shown in FIG. 1 is a single-layer DVD-type optical storage medium.

A transparent base substrate 4 is made of polycarbonate resin having 0.6 mm in thickness and 120 mm in diameter. The base substrate 4 may not be transparent. Formed on the substrate 4 is a recording layer 4a, information recorded thereon being optically reproducible. Formed on the recording layer 4a is a reflective layer 3 made of 70-nm-thick aluminum.

Provided on the reflective layer 3 is a 40-μm-thick dye-contained bonding layer 2. Bonded on the bonding layer 2 is a transparent substrate 1 having 0.6 mm in thickness and 120 mm in diameter.

Formed on the base substrate 4 but opposite to the reflective layer 3 is a 20-μm-thick label layer 5. In detail, the label layer 5 is formed by screen printing with dye (pigment)-contained ultraviolet-hardened resin. Recorded on the label layer 5 is information related to the contents recorded on the optical storage medium 10.

The dye-contained bonding layer 2 will be disclosed in detail.

Photochromic dyes are added to liquid-state ultraviolet-hardened resin. The dye-added ultraviolet-hardened resin is then heated. The heated resin is applied over the transparent substrate 1. The reflective layer formed on the base substrate 4 is placed on the resin. The substrates are being spun while forming the bonding layer 2 which is then hardened with irradiation of ultraviolet rays.

Used as ultraviolet-hardened resin is XR98 (made by Sumitomo Chemical Co. Ltd.) which is epoxyacrylate resin. Acrylate resin is feasible as ultraviolet-hardened resin for its high strength and adhesiveness. In addition to epoxyacrylate, urethane acrylate or their compound can be used as ultraviolet-hardened resin.

The photochromic dyes are added to the ultraviolet-hardened resin at 1% by weight for red-color emission and also at 1% by weight for blue-color emission.

A photochromic dye is colored when exposed to light of a specific wavelength (such as, ultraviolet rays) whereas it becomes colorless when exposed to light (such as, white light) of another specific wavelength at which the color is absorbed.

A photochromic dye feasible in this invention is stable, or does not suffer color absorption against laser wavelength in reproduction (780 nm for CDs, 650 nm for DVDs and 405 nm for next-generation optical media). In other words, a laser beam can reproduce information from an optical medium with no reflection and refraction even when such a photochromic dye is being colored.

The photochromic dye used for red color in this invention is cis-1,2-dicyano-1,2-bis(2,4,5-trimethyl-3-thienyl) ethene. That for blue color is 1,2-bis(5-phenyl-2-methylthiophene-3-yl)perfluorocyclopentene.

Such a photochromic dye can be selected from spirooxazines, spiropyrans, fulgides, and diaryl ethene. One requirement for the photochromic dye in this invention is that it will not absorb a laser beam when colored.

The following are feasible dyes among spirooxazine- and spiropyran-types:

6-bromo-1',3'-dihydro-1',3',3'-trimethyl-8-nitrospiro[2H-1-benzopyran-2,2'-(2H)-indole];

5-chloro-1,3-dihydro-1,3,3-trimethylspiro[2H-indole-2,3'-[3H]naphtho[2,1-b][1,4]oxazine];

5-chloro-1,3-dihydro-1,3,3-trimethylspiro[2H-indole-2,3'-[3H]naphtho[9,10-b][1,4]oxazine];

6,8-dibromo-1',3'-dihydro-1',3',3'-trimethylspiro[2H-1-benzopyran-2,2'-(2H)-indole];

1',3'-dihydro-1',3',3'-trimethyl-6-nitrospiro[2H-1-benzopyran-2,2'-(2H)-indole];

1',3'-dihydro-5'-methoxy-1',3',3'-trimethyl-6-nitrospiro[2H-1-benzopyran-2,2'-(2H)-indole];

1',3'-dihydro-8-methoxy-1',3',3'-trimethyl-6-nitrospiro[2H-1-benzopyran-2,2'-(2H)-indole];

1,3-dihydro-1,3,3-trimethylspiro[2H-indole-2,3'-[3H]naphtho[2,1-b][1,4]oxazine];

1,3-dihydro-1,3,3-trimethylspiro[2H-indole-2,3'-[3H]phenanthro[9,10-b][1,4]oxazine];

1,3-dihydro-1,3,3-trimethylspiro[2H-indole-2,3'-[3H]naptho[2,1-b]pyran]; and 1,3-dihydro-5-methoxy-1,3,3-trimethylspiro[2H-indole-2,3'-[3H]naphtho[2,1-b]pyran.

Dyes in fulgide type feasible in this invention are 2,5-dimethyl-3-furylethylidene succinic anhydride, and 2,5-dimethyl-3-furylisopropylidene succinic anhydride.

Moreover, dyes in diaryl ethene type feasible in this invention are 2,3-bis(2,4,5-trimethyl-3-thienyl)maleic anhydride, 2,3-bis(2,4,5-trimethyl-3-thienyl)maleimide, and cis-1,2-dicyano-1,2-bis(2,4,5-trimethyl-3-thienyl)ethene.

Disclosed next is a method of displaying (recording) information on a dye-contained layer (the dye-contained bonding layer 2). The method is also feasible for dye-contained hardcoat layers and dye-contained substrates.

Illustrated in FIGS. 2A to 2F is a first exemplary procedure of multi-color displaying on an optical storage medium according to the present invention. Illustrated in FIGS. 3A to 3F is a second exemplary procedure of multi-color displaying on an optical storage medium according to the present invention.

Disclosed first with reference to FIGS. 2A to 2F is recording graphic and/or character information on a dye-contained layer with masks (a first method of graphic-/character-pattern formation or multi-color displaying).

Figure 2A:
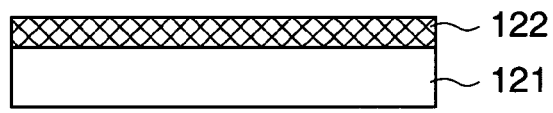
FIGS. 2A to 2F illustrate a first exemplary procedure of multi-color displaying on an optical storage medium according to the present invention.

Firstly, as shown in FIG. 2A, a dye-contained layer 122 having a certain thickness is formed on a substrate 121, by spin coating. The dye-contained layer 122 is made of ultraviolet-hardened resin containing two types of photochromic dyes which will be colored in blue and red, respectively, like the dye-contained bonding layer 2, explained above.

Figure 2B:
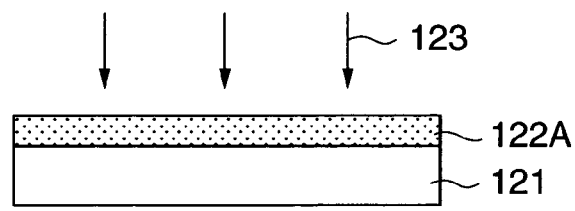

The dye-contained layer 122 is then exposed to ultraviolet rays (UV light) 123 over the surface for 10 seconds to 60 seconds, as shown in FIG. 2B. The layer 122 is thus hardened to become a colored dye-contained layer 122A. Red and blue dyes contained in the layer 122A are both colored, thus the layer 122A is colored in purple.

The UV light 123 is emitted from a light source (ENF-26OC/J, made by Spectonics Co.) for emitting black light of 365-nm wavelength.

Figure 2C:
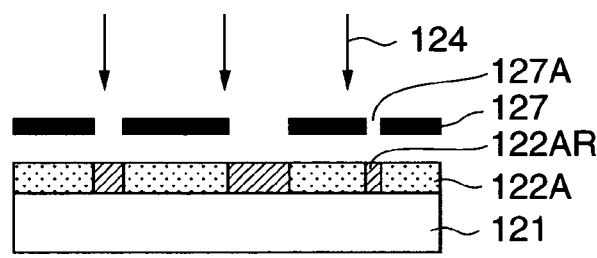

A mask 127 is placed over the purple-colored dye-contained layer 122A, as shown in FIG. 2C. It is patterned to have light-through openings 127A only over zones 122AR to be colored in red on the layer 122A. In other words, the mask pattern corresponds to a graphic or character pattern to be displayed in red on the layer 122A.

The purple-colored dye-contained layer 122A is then exposed to a laser beam 124 through the mask 127, at a blue-absorbing wavelength ($\lambda$max). The zones 122AR of the layer 122A are exposed to the laser beam 124 through the openings 127A, with blue dyes on the zones 122AR becoming colorless whereas red dyes on the same zones being colored unchanged, thus the zones 122AR being turned into red-colored dye-contained layers.

Figure 2D:
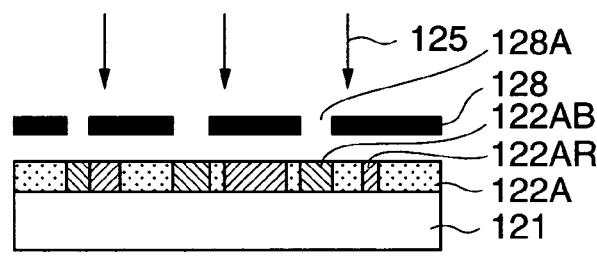

The mask 127 is replaced with a mask 128 over the dye-contained layer 122A, as shown in FIG. 2D. The mask 128 is patterned to have light-through openings 128A only over zones 122AB to be colored in blue on the layer 122A. In other words, the mask pattern corresponds to a graphic or character pattern to be displayed in blue on the layer 122A.

The dye-contained layer 122A is then exposed to a laser beam 128 through the mask 128, at a red-absorbing wavelength ($\lambda$max). The zones 122AB of the layer 122A are exposed to the laser beam 125 through the openings 128A, with red dyes on the zones 122AB becoming colorless whereas blue dyes on the same zones being colored unchanged, thus the zones 122AB being turned into blue-colored dye-contained layers.

Figure 2E:
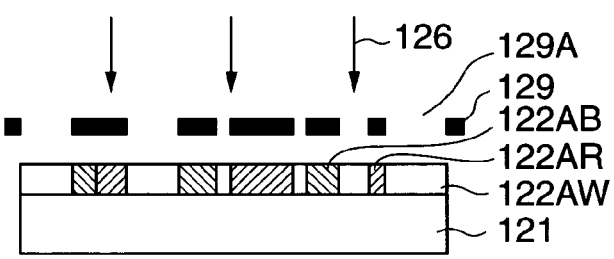

The mask 128 is replaced with a mask 129 over the dye-contained layer 122A, as shown in FIG. 2E, to make colorless or transparent (quasi-white) the purple-colored zones of the layer 122A, according to need. The mask 129 is patterned to have light-through openings 129A only over zones 122AW to be colorless on the layer 122A.

The dye-contained layer 122A is then exposed to a white light 126 through the mask 129 for 5 seconds to 20 seconds. The zones 122AW of the layer 122A are exposed to the white light beam 126 through the openings 129A, with red and blue dyes on the zones 122AW becoming colorless, thus the zones 122AW being turned into transparent dye-contained layers.

The white light 126 is emitted from MEGALIGHT (made by Hoya Co., Ltd.)

Figure 2F:
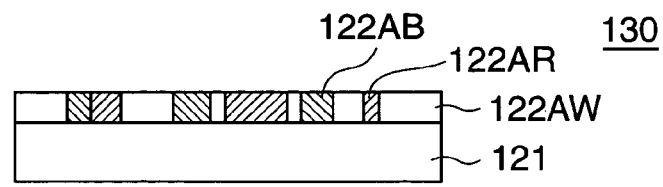

The mask 129 is removed, as shown in FIG. 2F, thus a disk 130 being produced, having the dye-contained layer 122A with a graphic or a character pattern of red, blue and transparent, corresponding to an additional information to be displayed (recorded) on an optical storage medium having the disk 130.

Disclosed next with respect to FIGS. 3A to 3F is recording graphic and/or character information on a dye-contained layer with filters and masks (a second method of graphic-/character-pattern formation or multi-color displaying).

Elements shown in FIGS. 3A to 3F that are identical or analogous to elements shown in FIGS. 2A to 2F are referenced by the same reference numerals and will not be explained in detail.

Figure 3A:
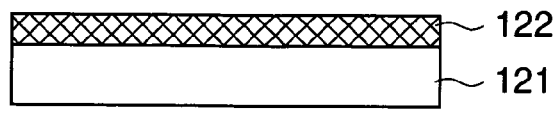
FIGS. 3A to 3F illustrate a second exemplary procedure of multi-color displaying on an optical storage medium according to the present invention.

As shown in FIG. 3A, a dye-contained layer 122 having a certain thickness is formed on a substrate 121, by spin coating.

Figure 3B:
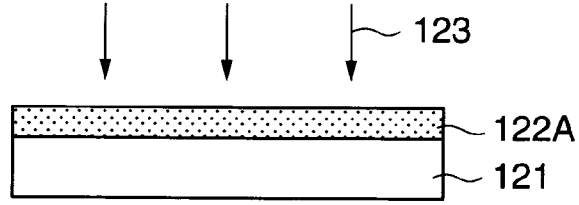

The dye-contained layer 122 is then exposed to ultraviolet rays (UV light) 123 over the surface, as shown in FIG. 3B. The layer 122 is hardened to become a colored dye-contained layer 122A. Red and blue dyes contained in the layer 122A are both colored, thus the layer 122A is colored in purple.

Figure 3C:
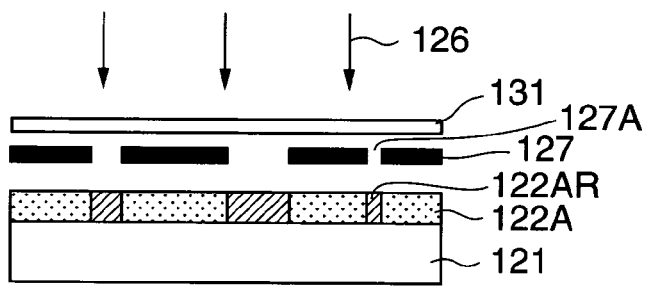

A mask 127 and also a filter 131 are placed over the purple-colored dye-contained layer 122A, as shown in FIG. 3C. The filter 131 allows light (red light) only to pass therethrough having a wavelength ($\lambda$max) at which the blue dye becomes colorless. The mask 127 is patterned to have light-through openings 127A only over zones 122AR to be colored in red on the layer 122A, the mask pattern corresponding to a graphic or a character pattern to be displayed in red on the layer 122A, like shown in FIG. 2C.

The dye-contained layer 122A is then exposed to a white light 126 through the filter 131 and the mask 127. The layer 122A is exposed to the white light beam 126 through the openings 127A, with the blue dye on the zones 122AR becoming colorless whereas the red dye on the same zones being colored unchanged, thus the zones 122AR being turned into red-colored dye-contained layers.

Figure 3D:
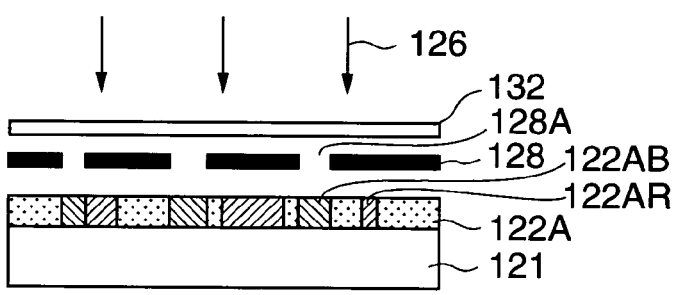

The filter 131 and the mask 127 are replaced with a filter 132 and a mask 128, respectively, over the dye-contained layer 122A, as shown in FIG. 3D. The filter 132 allows light (yellow-green light) only to pass therethrough having a wavelength ($\lambda$max) at which the red dye becomes colorless. The mask 128 is patterned to have light-through openings 128A only over zones 122AB to be colored in blue on the layer 122A, the mask pattern corresponding to a graphic or a character pattern to be displayed in blue on the layer 122A.

The dye-contained layer 122A is then exposed to the white light 126 again through the filter 132 and the mask 128. The layer 122A is exposed to the white light beam 126 through the openings 128A. In other words, the white light 126 is converted into a yellow-green light through filter 132 and the openings 128A to reach the layer 122A, the red dye on the zones 122AB becoming colorless whereas the blue dye on the same zones being colored unchanged, thus the zones 122AB being turned into blue-colored dye-contained layers.

Figure 3E:
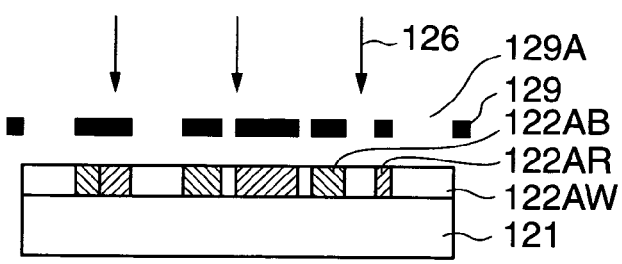

The filter 132 and the mask 128 are removed and a mask 129 is placed instead, as shown in FIG. 3E, to make colorless or transparent (quasi-white) the purple-colored zones of the layer 122A, according to need. The mask 129 is patterned to have light-through openings 129A only over zones 122AW to be colorless on the layer 122A.

The dye-contained layer 122A is then exposed to the white light 126 again through the mask 129. The zones 122AW of the layer 122A are exposed to the white light beam 126 through the openings 129A, with red and blue dyes on the zones 122AW becoming colorless, thus the zones 122AW being turned into transparent dye-contained layers.

Figure 3F:
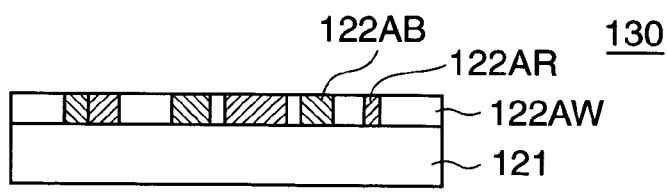

The mask 129 is removed, as shown in FIG. 3F, thus a disk 130 being produced, having the dye-contained layer 122A with a graphic or a character pattern of red, blue and transparent, corresponding to a certain information to be displayed (recorded) on an optical storage medium having the disk 130.

Figure 4:
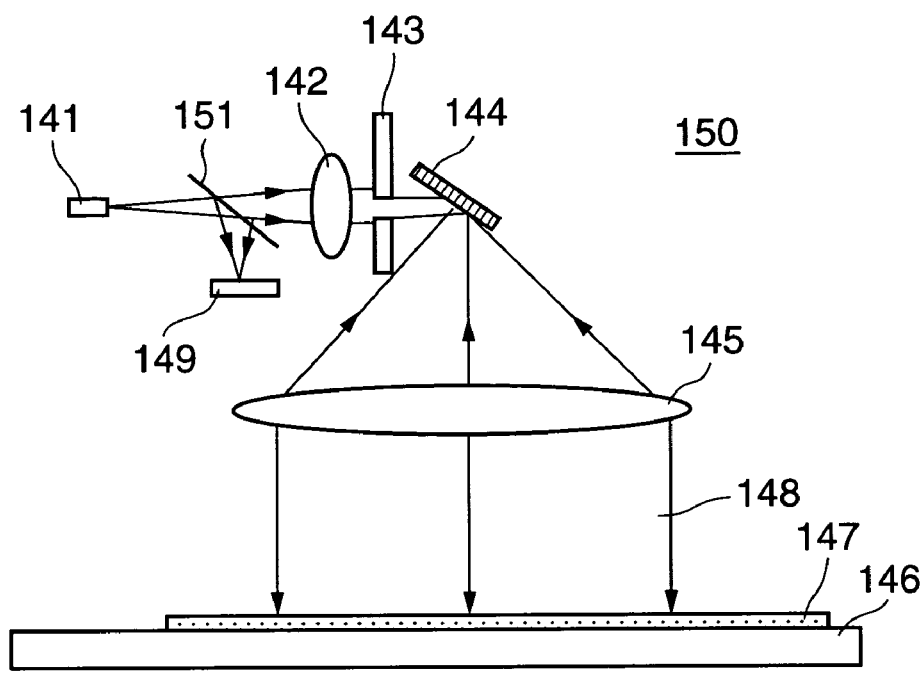
FIG. 4 illustrates a laser-beam exposure (writing) system used for an optical storage medium according to the present invention.

Disclosed next with respect to FIG. 4 is a laser-beam exposure (writing) system for directly radiating a laser beam having a certain wavelength to a dye-contained layer.

A laser-beam exposure system 150 is equipped with a semiconductor laser 141, a collimator lens 142, an aperture 143, a movable mirror 144, and an exposure lens 145. The optical components 142 to 145 are arranged in order along a light path of a laser beam to be emitted from the semiconductor laser 141.

An optical storage medium 146 is set on a stage (not shown) under the exposure lens 145. Formed on the storage medium 146 is a dye-contained layer 147 made of ultraviolet-hardened resin containing photochromic dyes, disclosed above.

In operation, a laser beam having a certain wavelength is emitted from the semiconductor laser 141. The emitted laser beam is converted into a parallel beam through the collimator lens 142.

The parallel beam is adjusted as having a certain beam diameter by the aperture 143 and then incident to the movable mirror 144.

The movable mirror 144 is movable along the axis perpendicular to its plane (surface) against the incident laser beam to change the direction of a reflected beam, like two-dimensional a fan beam, under control by a control signal supplied from a controller (not shown).

The two-dimensional laser beam reflected at the movable mirror 144 is refracted by the exposure lens 145 and perpendicularly incident to the dye-contained layer 147. The stage (not shown) is movable in the directions perpendicular to the plane of FIG. 4.

The laser beam is modulated by intensity modulation in accordance with pixels of a graphic or a character image to be displayed (recorded) on the dye-contained layer 147. The movable mirror 144 and the stage (not shown) are adjusted in angle and location, respectively, in accordance with the pixel arrangements.

The dye-contained layer 147 is then exposed to the modulated laser beam under the mirror/stage adjustments, thus the layer 147 being colored.

The colored dye-contained layer 147 becomes colorless when exposed to white light. Partial discoloring is achieved with a laser beam having a discoloring wavelength radiated onto the zones to be partially discolored on the colored dye-contained layer 147. Thus, information displayed (recorded) on the dye-contained layer is rewritable.

[Second Embodiment]

Figure 5:
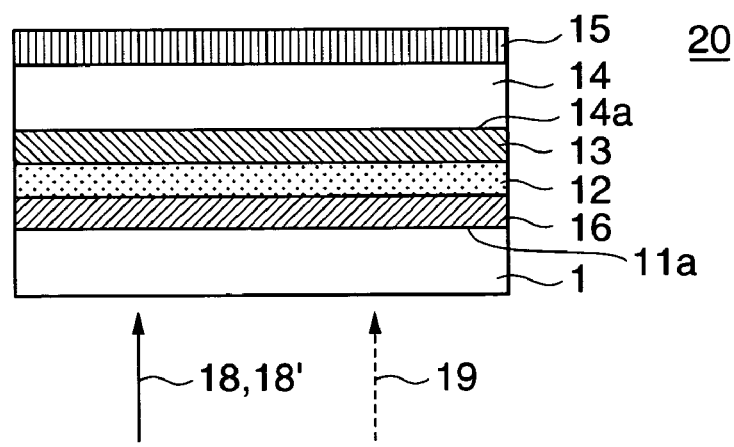
FIG. 5 illustrates a cross section of a second embodiment of optical storage medium according to the present invention.

Illustrated in FIG. 5 is a cross section of a second embodiment of optical storage medium according to the present invention.

An optical storage medium 20 shown in FIG. 5 is a dual-layer DVD-type optical storage medium.

A transparent substrate 11 and a transparent base substrate 14 are made of polycarbonate resin, both having 0.6 mm in thickness and 120 mm in diameter. The base substrate 14 may not be transparent. Formed on the substrates 11 and 14 are recording layers 11a and 14a, respectively, information recorded thereon being optically reproducible.

Formed on the recording layer 11a is a semi-transparent reflective layer 16 made of gold or silicon having thickness in the range from 5 nm to 10 nm. Formed on the recording layer 14a is a reflective layer 13 made of 70-nm-thick aluminum.

The transparent substrate 11 and the base substrate 14 are bonded each other via a 40-µm-thick dye-contained bonding layer 12 so that the semi-transparent reflective layer 16 and the reflective layer 13 face each other.

Formed on the base substrate 14 but opposite to the recording layer 14a is a label layer 15, like the label layer 5 disclosed in the first embodiment.

The dye-contained bonding layer 12 is formed in the same way as the counterpart 2 in the first embodiment.

A visible information pattern can be displayed (recorded) on the dye-contained bonding layer 12 with irradiation of a colored beam 18' incident to the transparent substrate 11, in accordance with the first or the second method of graphic-/character-pattern formation or multi-color displaying, disclosed in the first embodiment.

The visible information pattern can be erased with irradiation of a discoloring light 18 having a wavelength (λmax) at which the colored dye becomes colorless. Another information pattern can be displayed after erasure.

A laser beam 19 is radiated on the optical storage medium 20 when reproducing information recorded on the recording layers 11a and 14a, which is not affected by the dye-contained bonding layer 12 when passing therethrough.

[Third Embodiment]

Figure 6:
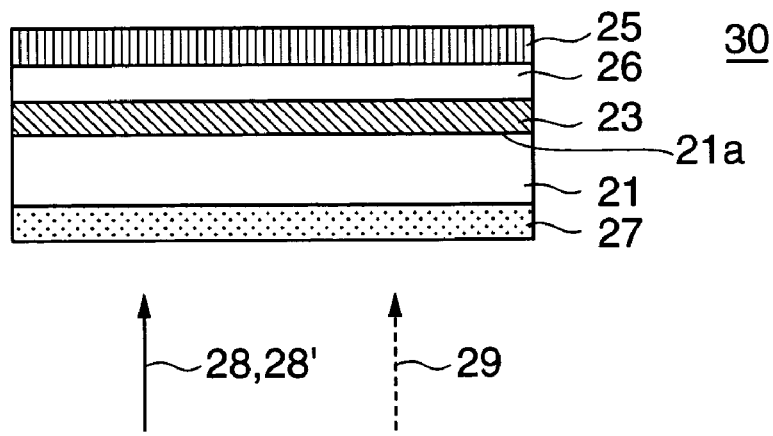
FIG. 6 illustrates a cross section of a third embodiment of optical storage medium according to the present invention.

Illustrated in FIG. 6 is a cross section of a third embodiment of optical storage medium according to the present invention.

An optical storage medium 30 shown in FIG. 6 is a single-layer CD-type optical storage medium.

A transparent substrate 21 is made of polycarbonate resin, having 1.2 mm in thickness and 120 mm in diameter. Formed on the substrate 21 is a recording layer 21a, information recorded thereon being optically reproducible.

Formed on the recording layer 21a is a reflective layer 23 made of 70-nm-thick aluminum. Provided on the reflective layer 23 is a 10-µm-thick protective layer 26 made of epoxyacrylate resin which is ultraviolet-hardened resin.

Formed on the protective layer 26 is a 20-µm-thick label layer 25. In detail, the label layer 25 is formed by screen printing with pigment (dye)-contained ultraviolet-hardened resin. Recorded on the label layer 25 is information related to the contents recorded on the optical storage medium 30.

Formed on the substrate 21 but opposite to the recording layer 21a is a 20-µm-thick hardcoat layer 27. In detail, photochromic dyes are added to ultraviolet-hardened resin. The resin is heated to melt the photochromic dyes. The dye-melted resin is applied, by spin coating, onto the substrate 21 but opposite to the recording layer 21a. The coated resin is exposed to ultraviolet rays to be hardened to become the hardcoat layer 27.

The ultraviolet-hardened resin is XR98 (made by Sumitomo Chemical Co. Ltd.) which is epoxyacrylate resin.

The photochromic dyes added to the ultraviolet-hardened resin are at 1% by weight for red-color emission and also at 1% by weight for blue-color emission.

The photochromic dye used for red color is cis-1,2-dicyano-1,2-bis(2,4,5-trimethyl-3-thienyl)ethene. That for blue color is 1,2-bis(5-phenyl-2-methylthiophene-3-yl)perfluorocyclopentene.

A graphic or a character information pattern of blue, red, colorless and purple can be displayed on the dye-contained hardcoat layer 27 with irradiation of a colored beam 28', in accordance with the first or the second method of graphic-/character-pattern formation or multi-color displaying, disclosed in the first embodiment.

Red, blue or purple graphic or character information pattern can be discolored with irradiation of light (discoloring light 28) having a wavelength at which the corresponding colored photochromic dye is colorless, thus information represented by the graphic or character information pattern being rewritable. White light discolors all of the red, blue and purple patterns.

A laser beam 29 is radiated on the optical storage medium 30 when reproducing information recorded on the recording layer 21a, which is not affected by the dye-contained hardcoat layer 27 when passing therethrough.

[Fourth Embodiment]

Figure 7:
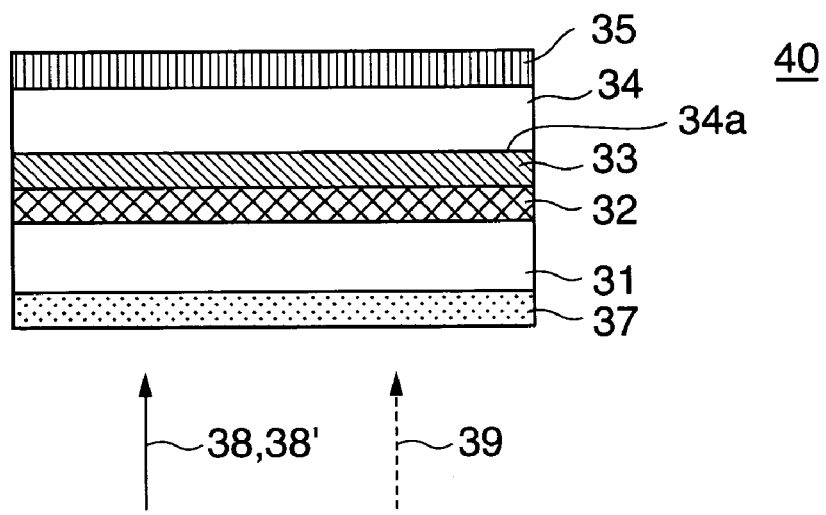
FIG. 7 illustrates a cross section of a fourth embodiment of optical storage medium according to the present invention.

Illustrated in FIG. 7 is a cross section of a fourth embodiment of optical storage medium according to the present invention.

An optical storage medium 40 shown in FIG. 7 is a single-layer DVD-type optical storage medium.

A transparent base substrate 34 is made of polycarbonate resin, having 0.6 mm in thickness and 120 mm in diameter. The base substrate 34 may not be transparent. Formed on the substrate 34 is a recording layer 34a, information recorded thereon being optically reproducible.

Formed on the recording layer 34a is a reflective layer 33 made of 70-nm-thick aluminum.

Bonded on the substrate 34 via the reflective layer 33 with a 40-μm-thick bonding layer 32 is a transparent substrate 31 made of polycarbonate resin having 0.6 mm in thickness and 120 mm in diameter.

Formed on the substrate 33 but opposite to the protective layer 33 is a 20-μm-thick label layer 35. In detail, the label layer 35 is formed by screen printing with pigment (dye)-contained ultraviolet-hardened resin. Recorded on the label layer 35 is information related to the contents recorded on the optical storage medium 40.

Used as the bonding layer 32, ultraviolet-hardened resin, is XR98 (made by Sumitomo Chemical Co. Ltd.) which is epoxyacrylate resin. In detail, the epoxyacrylate resin XR98 is applied over the substrate 31. The substrate 34 is placed on the substrate 31 via the reflective layer 33. The stacked substrates are spun and then exposed to ultraviolet rays to harden the epoxyacrylate resin to form the bonding layer 32.

Formed on the substrate 31 but opposite to the bonding layer 32 is a dye-contained hardcoat layer 37, in the same way as the counterpart 27 in the third embodiment.

A desired graphic or character pattern can be displayed (recorded) on the dye-contained hardcoat layer 37, as rewritable, while information recorded on the recording layer 34a is reproducible.

[Fifth Embodiment]

Figure 8:
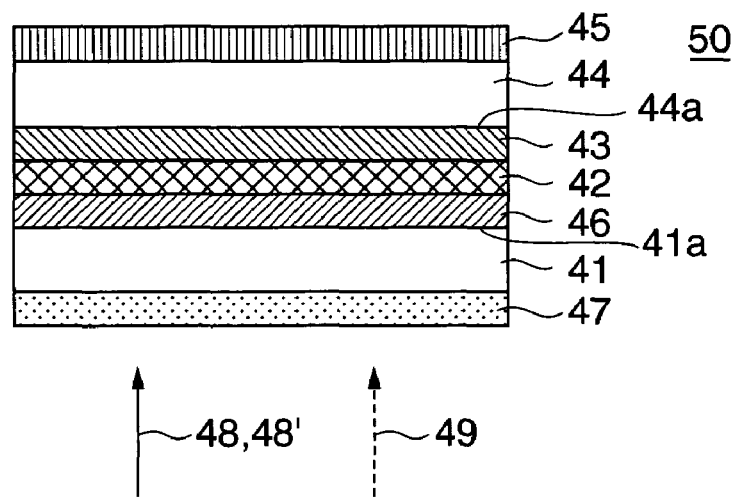
FIG. 8 illustrates a cross section of a fifth embodiment of optical storage medium according to the present invention.

Illustrated in FIG. 8 is a cross section of a fifth embodiment of optical storage medium according to the present invention.

An optical storage medium 50 shown in FIG. 8 is a dual-layer DVD-type optical storage medium, like the second embodiment.

A transparent substrate 41 and a transparent base substrate 44 are made of polycarbonate resin, both having 0.6 min thickness and 120 mm in diameter. The base substrate 44 may not be transparent. Formed on the substrates 41 and 44 are recording layers 41a and 44a, respectively, information recorded thereon being optically reproducible.

Formed on the recording layer 41a is a semi-transparent reflective layer 46 made of gold or silicon having thickness in the range from 5 nm to 10 nm. Formed on the recording layer 44a is a reflective layer 43 made of 70-nm-thick aluminum.

The transparent substrate 41 and the base substrate 44 are bonded each other via a 40-μm-thick bonding layer 42 so that the semi-transparent reflective layer 46 and the reflective layer 43 face each other.

Formed on the transparent substrate 41 but opposite to the semi-transparent reflective layer 46 is a dye-contained hardcoat layer 47, in the same as the counterpart 27 in the third embodiment.

A desired graphic or character pattern can be displayed on the dye-contained hardcoat layer 47, as rewritable, with a discoloring light 48 and a coloring light 48', while information recorded on the recording layer 44a is reproducible with a laser beam 49.

[Sixth Embodiment]

Figure 9:
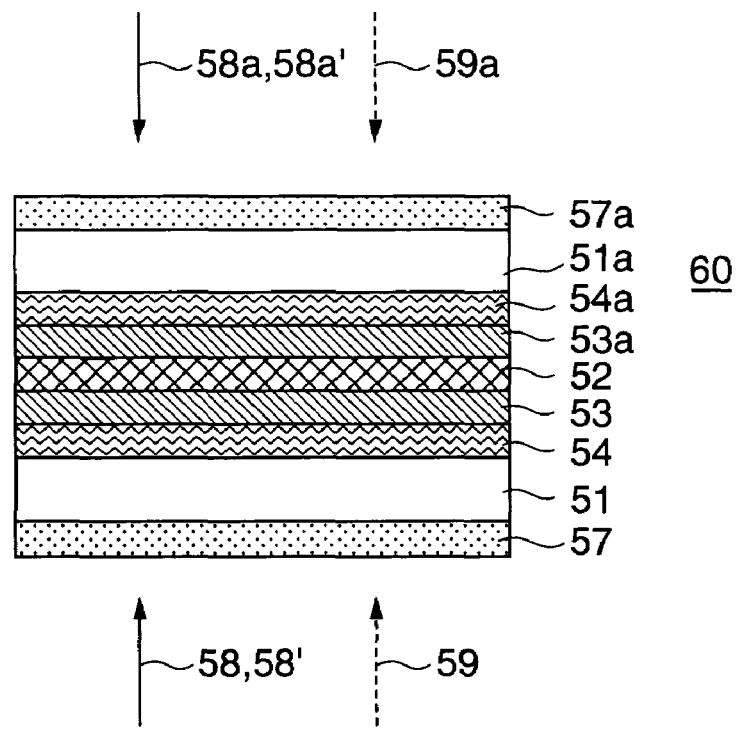
FIG. 9 illustrates a cross section of a sixth embodiment of optical storage medium according to the present invention.

Illustrated in FIG. 9 is a cross section of a sixth embodiment of optical storage medium according to the present invention.

An optical storage medium 60 shown in FIG. 9 is a dual-layer optical disk writable on both sides, like, DVD-RW.

Transparent substrates 51 and 51a are made of polycarbonate resin, both having 0.6 mm in thickness and 120 mm in diameter. Formed on the substrates 51 and 51a are phase-change recording layers 54 and 54a, respectively, both made of an AgInSbTe compound having about 50 nm in thickness.

Formed on the phase-change recording layers 54 and 54a are reflective layers 53 and 53a, respectively, both made of 70-nm-thick aluminum.

Formed on the substrate 51 but opposite to the phase-change recording layer 54 is a dye-contained hardcoat layer 57. Moreover, formed on the substrate 51a but opposite to the phase-change recording layer 54a is a dye-contained hardcoat layer 57a.

The dye-contained hardcoat layers 57 and 57a are formed in the same way as the counterpart 27 in the third embodiment.

The substrates 51 and 51a are bonded each other via a bonding layer 52 so that the reflective layers 53 and 53a face each other. The bonding layer 52 is made of a 40-μm-thick sheet thermal-hardened acrylic adhesive.

Graphic or character information patterns of blue, red, colorless and purple, related to information stored on the phase-change recording layers 54 and 54a, respectively, can be displayed on the dye-contained hardcoat layers 57 and 57a with irradiation of colored beams 58' and 58'a, like the third embodiment.

Red, blue or purple graphic or character information pattern can be discolored with irradiation of light (discoloring light 58 and 58a) having a wavelength at which the corresponding colored photochromic dye is colorless, thus information represented by the graphic or character information pattern being rewritable. White light discolors all of the red, blue and purple patterns.

Laser beams 59 and 59a are radiated on the optical storage medium 60 when reproducing information recorded on the phase-change recording layers 54 and 54a, respectively, which are not affected by the dye-contained hardcoat layers 57 and 57a, respectively, when passing therethrough.

[Seventh Embodiment]

Figure 10:
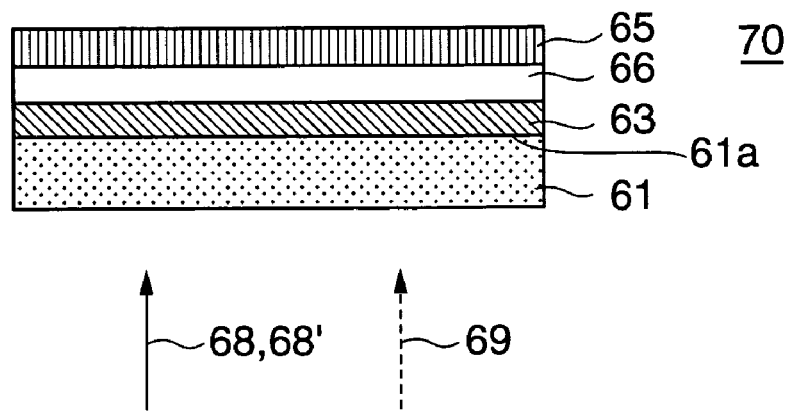
FIG. 10 illustrates a cross section of a seventh embodiment of optical storage medium according to the present invention.

Illustrated in FIG. 10 is a cross section of a seventh embodiment of optical storage medium according to the present invention.

An optical storage medium 70 shown in FIG. 10 is a single-layer CD-type optical storage medium, like the third embodiment. However, different from the third embodiment, the optical storage medium 70 is equipped with a dye-contained transparent substrate 61 made of polycarbonate resin having 1.2 mm in thickness and 120 mm in diameter.

The dye-contained substrate 61 is produced, by injection molding, from a polycarbonate-resin pellet. Photochromic dyes of 1% by weight are added to polycarbonate resin which is then kneaded to be the pellet.

A photochromic dye used for red color is cis-1,2-dicyano-1,2-bis(2,4,5-trimethyl-3-thienyl)ethene. That for blue color is 1,2-bis(5-phenyl-2-methylthiophene-3-yl)perfluorocyclopentene.

Formed on the dye-contained substrate 61 is a recording layer 61a, information recorded thereon being optically reproducible.

Formed on the recording layer 61a is a reflective layer 63 made of 70-nm-thick aluminum. Formed on the reflective layer 63 is a 10-μm-thick protective layer 26 made of epoxyacrylate resin which is ultraviolet-hardened resin.

Formed on the protective layer 66 is a 20-μm-thick label layer 65. In detail, the label layer 65 is formed by screen printing with pigment (dye)-contained ultraviolet-hardened resin. Recorded on the label layer 65 is information related to the contents recorded on the optical storage medium 70.

A graphic or a character information pattern of blue, red, colorless and purple can be displayed on the dye-contained substrate 61 with irradiation of a colored beam 68', in accordance with the first or the second method of graphic-/character-pattern formation or multi-color displaying, disclosed in the first embodiment.

Red, blue or purple graphic or character information pattern can be discolored with irradiation of light (discoloring light 68) having a wavelength at which the corresponding colored photochromic dye is colorless, thus information represented by the graphic or character information pattern being rewritable. White light discolors all of the red, blue and purple patterns.

A laser beam 69 is radiated on the optical storage medium 70 when reproducing information recorded on the recording layer 61a, which is not affected by the dye-contained substrate 61 when passing therethrough.

[Eighth Embodiment]

Figure 11:
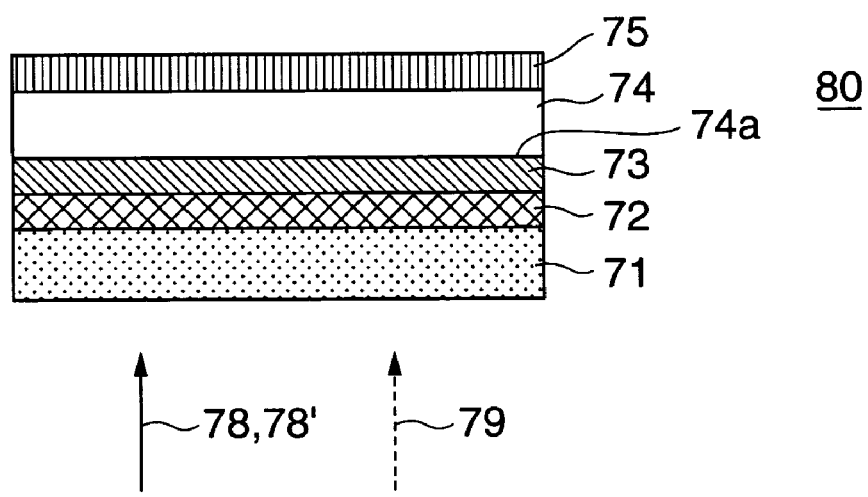
FIG. 11 illustrates a cross section of an eighth embodiment of optical storage medium according to the present invention.

Illustrated in FIG. 11 is a cross section of an eighth embodiment of optical storage medium according to the present invention.

An optical storage medium 80 shown in FIG. 11 is a single-layer DVD-type optical storage medium, like the first embodiment. However, different from the first embodiment, the optical storage medium 80 is equipped with a dye-contained substrate 71 made of polycarbonate resin having 0.6 mm in thickness and 120 mm in diameter.

The dye-contained substrate 71 is a transparent substrate containing blue and red photochromic dyes, like the counterpart 61 in the seventh embodiment.

The optical storage medium 80 is also equipped with a transparent base substrate 74 made of polycarbonate resin having 0.6 mm in thickness and 120 mm in diameter. Formed on the substrate 74 is a recording layer 74a, information recorded thereon being optically reproducible. Formed on the recording layer 74a is a reflective layer 73 made of 70-nm-thick aluminum.

The dye-contained substrate 71 and the base substrate 74 are bonded each other via the reflective layer 73 with a transparent bonding layer 72.

Formed on the base substrate 74 but opposite to the recording layer 74a is a 20-μm-thick label layer 75. In detail, the label layer 75 is formed by screen printing with pigment (dye)-contained ultraviolet-hardened resin. Recorded on the label layer 75 is information related to the contents recorded on the optical storage medium 80.

A graphic or a character information pattern of blue, red, colorless and purple can be displayed on the dye-contained substrate 71 with irradiation of a colored beam 78', in accordance with the first or the second method of graphic-/character-pattern formation or multi-color displaying, disclosed in the first embodiment.

Red, blue or purple graphic or character information pattern can be discolored with irradiation of light (discoloring light 78) having a wavelength at which the corresponding colored photochromic dye is colorless, thus information represented by the graphic or character information pattern being rewritable. White light discolors all of the red, blue and purple patterns.

A laser beam 79 is radiated on the optical storage medium 80 when reproducing information recorded on the recording layer 74a, which is not affected by the dye-contained substrate 71 when passing therethrough.

[Ninth Embodiment]

Figure 12:
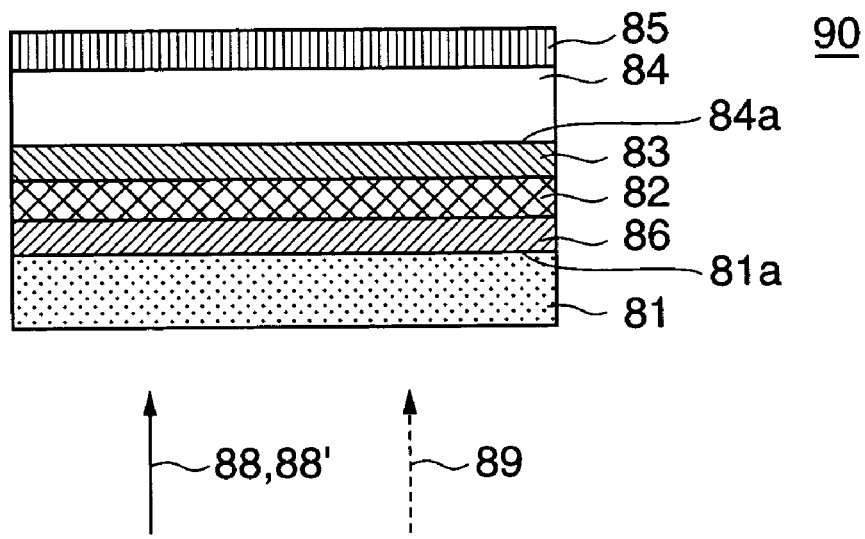
FIG. 12 illustrates a cross section of a ninth embodiment of optical storage medium according to the present invention.

Illustrated in FIG. 12 is a cross section of a ninth embodiment of optical storage medium according to the present invention.

An optical storage medium 90 shown in FIG. 12 is a dual-layer DVD-type optical storage medium, like the second embodiment. However, different from the second embodiment, the optical storage medium 90 is equipped with a dye-contained substrate 81 made of polycarbonate resin having 0.6 mm in thickness and 120 mm in diameter.

The dye-contained substrate 81 is a transparent substrate containing blue and red photochromic dyes, like the counterpart 61 in the seventh embodiment. Formed on the substrate 81 is a recording layer 81a, information recorded thereon being optically reproducible. Formed on the recording layer 81a is a semi-transparent reflective layer 86 made of gold or silicon having a thickness in the range from 5 nm to 10 nm.

The optical storage medium 90 is also equipped with a transparent base substrate 84 made of polycarbonate resin, having 0.6 mm in thickness and 120 mm in diameter. Formed on the substrate 84 is a recording layer 84a, information recorded thereon being optically reproducible. Formed on the recording layer 84a is a reflective layer 83 made of 70-nm-thick aluminum.

The dye-contained substrate 81 and the base substrate 84 are bonded each other via a transparent bonding layer 82 so that the reflective layer 83 and the semi-transparent reflective layer 86 face each other.

Formed on the base substrate 84 but opposite to the recording layer 84a is a 20-μm-thick label layer 85. In detail, the label layer 85 is formed by screen printing with pigment (dye)-contained ultraviolet-hardened resin. Recorded on the label layer 85 is information related to the contents recorded on the optical storage medium 90.

A graphic or a character information pattern of blue, red, colorless and purple can be displayed on the dye-contained substrate 81 with irradiation of a colored beam 88', in accordance with the first or the second method of graphic-/character-pattern formation or multi-color displaying, disclosed in the first embodiment.

Red, blue or purple graphic or character information pattern can be discolored with irradiation of light (discoloring light 88) having a wavelength at which the corresponding colored photochromic dye is colorless, thus information represented by the graphic or character information pattern being rewritable. White light discolors all of the red, blue and purple paterns.

A laser beam 89 is radiated on the optical storage medium 90 when reproducing information recorded on the recording layers 81a and 84a, which is not affected by the dye-contained substrate 81 when passing therethrough.

[Tenth Embodiment]

Figure 13:
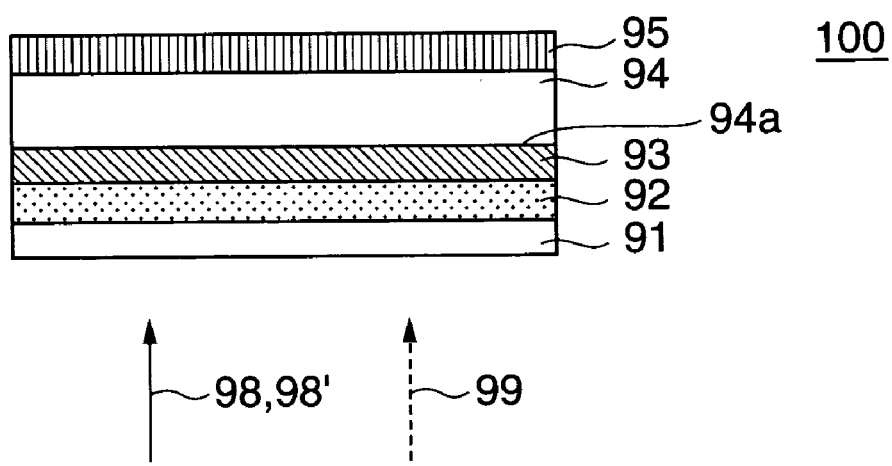
FIG. 13 illustrates a cross section of a tenth embodiment of optical storage medium according to the present invention.

Illustrated in FIG. 13 is a cross section of a tenth embodiment of optical storage medium according to the present invention.

An optical storage medium 100 shown in FIG. 13 is equipped with a transparent base substrate 94 made of polycarbonate resin, having 1.1 mm in thickness and 120 mm in diameter. The base substrate 94 may not be transparent. Formed on the substrate 94 is a recording layer 94a, information recorded thereon being optically reproducible. Formed on the recording layer 94a is a reflective layer 93 made of 70-nm-thick aluminum.

Formed on the reflective layer 93 is a transparent cover layer 91 made of polycarbonate resin having 0.1 mm in thickness and 120 mm in diameter via a 40-μm-thick dye-contained boding layer 92. The transparent cover layer 91 is a transparent substrate thinner than the base substrate 94.

The boding layer 92 is formed in the same way as the counterpart 2 in the first embodiment, containing blue and red photochromic dyes.

Formed on the base substrate 94 but opposite to the recording layer 94a is a 20-μm-thick label layer 95. In detail, the label layer 95 is formed by screen printing with pigment (dye)-contained ultraviolet-hardened resin. Recorded on the label layer 95 is information related to the contents recorded on the optical storage medium 100.

A graphic or a character information pattern of blue, red, colorless and purple can be displayed on the dye-contained bonding layer 92 with irradiation of a colored beam 98', in accordance with the first or the second method of graphic-/character-pattern formation or multi-color displaying, disclosed in the first embodiment.

Red, blue or purple graphic or character information pattern can be discolored with irradiation of light (discoloring light 98) having a wavelength at which the corresponding colored photochromic dye is colorless, thus information represented by the graphic or character information pattern being rewritable. White light discolors all of the red, blue and purple patterns.

A laser beam 99 is radiated on the optical storage medium 100 when reproducing information recorded on the recording layer 94a, which is not affected by the dye-contained bonding layer 92 when passing therethrough.

[Eleventh Embodiment]

Figure 14:
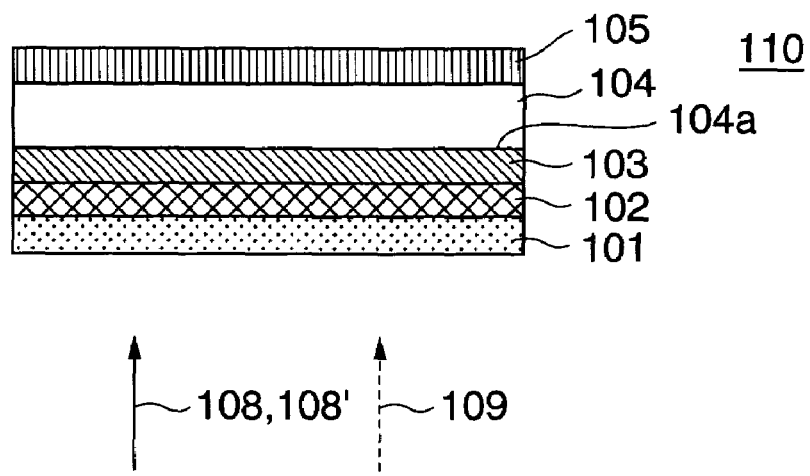
FIG. 14 illustrates a cross section of an eleventh embodiment of optical storage medium according to the present invention.

Illustrated in FIG. 14 is a cross section of an eleventh embodiment of optical storage medium according to the present invention.

An optical storage medium 110 shown in FIG. 14 is equipped with a transparent base substrate 104 made of polycarbonate resin having 1.1 mm in thickness and 120 mm in diameter. Formed on the substrate 104 is a recording layer 104a, information recorded thereon being optically reproducible. Formed on the recording layer 104a is a reflective layer 103 made of 70-nm-thick aluminum.

Formed on the reflective layer 103 is a transparent dye-contained cover layer 101 made of polycarbonate resin having 0.1 mm in thickness and 120 mm in diameter via a 40-μm-thick bonding layer 102 made of ultraviolet-hardened resin.

The dye-contained cover layer 101 is produced, by sheet molding, from a polycarbonate-resin pellet. Photochromic dyes of 1% by weight are added to polycarbonate resin which is then kneaded to be the pellet.

A photochromic dye used for red color is cis-1,2-dicyano-1,2-bis(2,4,5-trimethyl-3-thienyl)ethene. That for blue color is 1,2-bis(5-phenyl-2-methylthiophene-3-yl)perfluorocyclopentene.

Formed on the base substrate 104 but opposite to the recording layer 104a is a 20-μm-thick label layer 105. In detail, the label layer 105 is formed by screen printing with pigment (dye)-contained ultraviolet-hardened resin. Recorded on the label layer 105 is information related to the contents recorded on the optical storage medium 110.

A graphic or a character information pattern of blue, red, colorless and purple can be displayed on the dye-contained cover layer 101 with irradiation of a colored beam 108', in accordance with the first or the second method of graphic-/character-pattern formation or multi-color displaying, disclosed in the first embodiment.

Red, blue or purple graphic or character information pattern can be discolored with irradiation of light (discoloring light 108) having a wavelength at which the corresponding colored photochromic dye is colorless, thus information represented by the graphic or character information pattern being rewritable. White light discolors all of the red, blue or purple patterns.

A laser beam 109 is radiated on the optical storage medium 110 when reproducing information recorded on the recording layer 104a, which is not affected by the dye-contained cover layer 101 when passing therethrough.

[Twelfth Embodiment]

Figure 15:
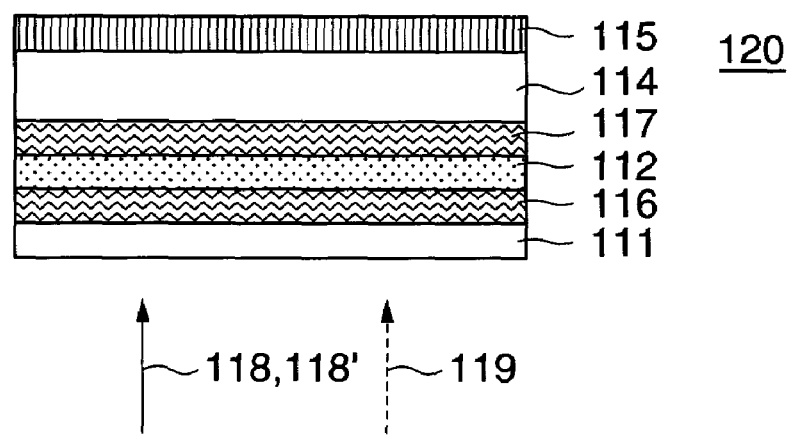
FIG. 15 illustrates a cross section of a twelfth embodiment of optical storage medium according to the present invention.

Illustrated in FIG. 15 is a cross section of a twelfth embodiment of optical storage medium according to the present invention.

An optical storage medium 120 shown in FIG. 15 is equipped with a transparent base substrate 114 made of polycarbonate resin having 1.1 mm in thickness and 120 mm in diameter. The base substrate 114 may not be transparent.

Formed on the base substrate 114 is a recording layer 117 made of an AgInSbTe compound having a thickness in the range from 50 nm to 60 nm. Information can be recorded/reproduced on/from the recording layer 117 with radiation of a laser beam 119.

The optical storage medium 120 is also equipped with a transparent cover layer 111 made of polycarbonate resin having 0.1 mm in thickness and 120 mm in diameter. The transparent cover layer 111 is transparent substrate thinner than the base substrate 114.

Formed on the cover layer 111 is a recording layer 116 made of an AgInSbTe compound having a thickness in the range from 10 nm to 20 nm.

The recording layers 116 and 117 are bonded each other via a 40-μm-thick dye-contained bonding layer 112. The bonding layer 112 is formed in the same way as the counterpart 2 in the first embodiment, containing blue and red photochromic dyes.

Formed on the base substrate 114 but opposite to the recording layer 117 is a 20-μm-thick label layer 115. In detail, the label layer 115 is formed by screen printing with pigment (dye)-contained ultraviolet-hardened resin. Recorded on the label layer 115 is information related to the contents recorded on the optical storage medium 120.

In recording or reproduction, the laser beam 119 partially passes through the recording layer 116 whereas it is completely reflected at the recording layer 117 (total reflection)

A graphic or a character information pattern of blue, red, colorless and purple can be displayed on the dye-contained bonding layer 112 with irradiation of a colored beam 118', in accordance with the first or the second method of graphic/character-pattern formation or multi-color displaying, disclosed in the first embodiment.

Red, blue or purple graphic or character information pattern can be discolored with irradiation of light (discoloring light 118) having a wavelength at which the corresponding colored photochromic dye is colorless, thus information represented by the graphic or character information pattern being rewritable. White light discolors all of the red, blue and purple patterns.

The laser beam 119 is radiated on the optical storage medium 120 when reproducing/reproduction on/from the recording layers 116 and 117, which is not affected by the dye-contained bonding layer 112 when passing therethrough.

Disclosed on dispersion of photochromic dyes in a dye-contained layer is kneading the dyes in a resin material of a transparent substrate or a bonding material of a bonding layer.

Not only that, photochromic dyes may be penetrated into a transparent substrate over the surface by vapor transportation etc. Moreover, a dye-contained layer may be formed on a bonding layer by deposition, etc.

Furthermore, in addition to the circular optical storage media as disclosed above, the present invention is applicable to card-type optical storage media, such as medical cards used at hospitals. For example, medical history is recorded on a CD-ROM area or a CD-R area on a medical card whereas additional information, such as, next appointment date and time, can be visibly recorded on a dye-contained layer on the medical card formed according to the present invention.

Not only such medical cards for hospital use, the present invention is applicable to a variety of fields, thanks to advantages of the dye-contained layer, such as, no effects to recording/reproduction of information on/from an optical storage medium, high visibility, high artistry, high user customizability, high productivity and low cost.

The following are several applications under the present invention.

The dye-contained layer according to the present invention can be used as a water mark on an optical storage disk for disk (security) management.

Figure 16:
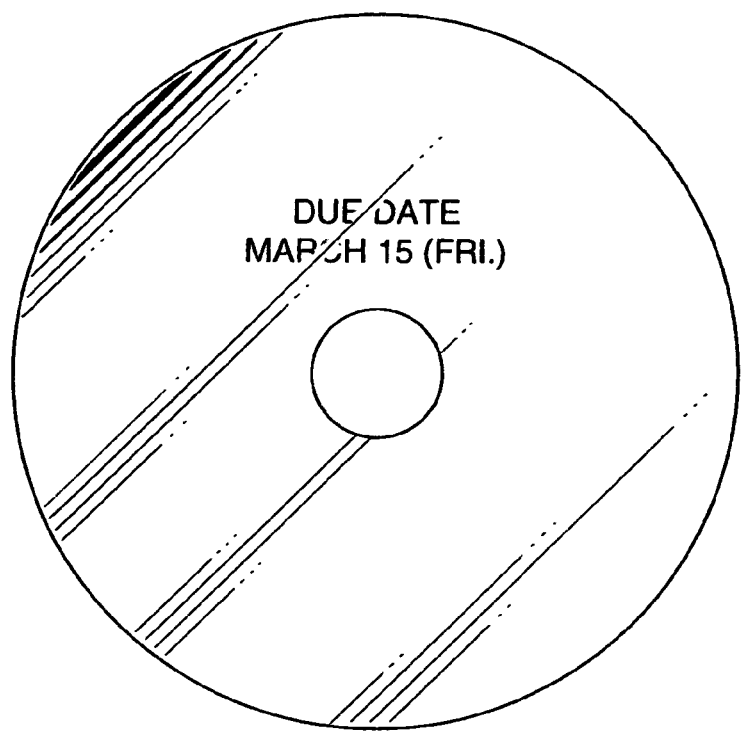
FIG. 16 illustrates a DVD with additional information recorded on a dye-contained layer according to the present invention and visibly displayed on the DVD.

Any information, such as a due date, can be visibly and rewritably recorded at a rental shop, as shown in FIG. 16, on the dye-contained layer according to the present invention formed on a DVD.

Figure 17:
FIG. 17 illustrates a CD with a photo recorded on the dye-contained layer according to the present invention and visibly displayed on the CD.

A title of song, a photo and an autograph of a singer, etc., can be visibly recorded, as shown in FIG. 17, on the dye-contained layer according to the present invention, at CD and DVD makers.

Any message can be visibly recorded on the dye-contained layer according to the present invention, formed on CDs and DVDs, for example, when a customer buys a CD or DVD as a gift to someone at a CD shop.

Moreover, a customer can be offered a special service when he or she buys a CD or DVD at a CD shop installing a special printing machine.

In detail, a customer stands in front of the machine. He or she presses a button to choose the face of a singer singing songs for a CD or DVD he or she bought as a background of his or her photo, then presses another button to take his or her picture. An image of him or her with the singer is then visibly recorded on the dye-contained layer according to the present invention formed on the CD or DVD he or she bought.

Instead of a singer, an image of him with a girl friend may be visibly recorded on the dye-contained layer according to the present invention.

Moreover, a user can visibly record any information on the dye-contained layer according to the present invention formed on a writable CD or DVD. For example, a DVD recorder may be equipped with additional-information recording and erasing functions (with laser wavelengths 405 nm and 650 nm, respectively) in addition to a usual DVD-data recording function (with a laser wavelength 650 nm).

Figure 18:
FIG. 18 illustrates a DVD with additional information recorded, by a user, on the dye-contained layer according to the present invention and visibly displayed on the DVD.

With such a DVD recorder, any additional information can be visibly and rewritably recorded, as shown in FIG. 18, on the dye-contained layer according to the present invention formed on a CD- or DVD-RW through a label layer whereas DVD data can be recorded on the transparent-substrate side.

As disclosed above in detail, the present invention offers a dye-contained layer, such as, a dye-contained bonding layer, a dye-contained hardcoat layer, a dye-contained cover layer, and a dye-contained substrate, made of ultraviolet-hardened resin and at least one type of photochromic dye stable against a laser beam, formed as a component layer of an optical storage medium.

Therefore, the present invention provides an optical storage medium having the dye-contained layer, for which any additional information related to the information recorded on the optical storage medium can be visibly and rewritably displayed (recorded) on the dye-contained layer.

What is claimed is:

1. An optical storage medium comprising:
   a first substrate;
   a recording layer formed on the first substrate to store first information as being reproducible with irradiation of a laser beam;
   a reflective layer formed on the recording layer;
   a second transparent substrate, the laser beam being incident to the second substrate in reproduction; and
   a bonding layer provided between the first and the second substrates, the first and second substrates being bonded to each other by the bonding layer via the reflective layer, the bonding layer being made of ultraviolet-hardened resin including at least one type of photochromic dye, to store second information on the bonding layer, the second information being visible through the second transparent substrate when the photochromic dye is colored by being exposed to light of a first specific wavelength different from a wavelength of the laser beam, the photochromic dye thus colored remaining unchanged against the laser beam.

2. The optical storage medium according to claim 1 further comprising a semi-transparent reflective layer formed on another recording layer provided on the second transparent substrate, the substrates being bonded to each other so that the reflective layers face each other at surfaces thereof opposite to other surfaces thereof formed on the recording layers.

3. The optical storage medium according to claim 1, wherein the second information is erased when the photochromic dye is discolored by being exposed to light of a second specific wavelength different from the first specific wavelength and the wavelength of the laser beam.

4. The optical storage medium according to claim 1, wherein the second information that is visible through the second transparent substrate is graphic and/or character information.

5. The optical storage medium according to claim 3, wherein the graphic and/or character information is formed through a mask and/or a file.

6. The optical storage medium according to claim 3, wherein the graphic and/or character information is formed by an exposure system including a laser that emits a laser beam, at least one optical component situated along a light path of the laser beam, and a deflector to change a direction of the emitted laser beam.

7. The optical storage medium according to claim 1, wherein the ultraviolet-hardened resin includes a photochromic dye that us colored when exposed to light of a specific wavelength of blue light and another photochromic dye that us colored when exposed to light of a specific wavelength of red light.

* * * * *